US012136757B2

(12) United States Patent
Alderman et al.

(10) Patent No.: US 12,136,757 B2
(45) Date of Patent: Nov. 5, 2024

(54) MMIC DEVICE ON A SUBSTRATE AND MOUNTED WITHIN A WAVEGUIDE BLOCK, WHEREIN A METAL FOIL LAYER EXTENDS FROM THE SUBSTRATE TO FORM IN PART A THROUGH HOLE

(71) Applicant: TERATECH COMPONENTS LIMITED, Didcot (GB)

(72) Inventors: Byron Alderman, Didcot (GB); Jeffrey Powell, Didcot (GB)

(73) Assignee: Teratech Components Limited, Didcot (GB)

( * ) Notice: Subject to any disclaimer, the term of this patent is extended or adjusted under 35 U.S.C. 154(b) by 326 days.

(21) Appl. No.: 17/769,755

(22) PCT Filed: Oct. 16, 2020

(86) PCT No.: PCT/GB2020/052614
§ 371 (c)(1),
(2) Date: Apr. 17, 2022

(87) PCT Pub. No.: WO2021/074642
PCT Pub. Date: Apr. 22, 2021

(65) Prior Publication Data
US 2022/0376375 A1 Nov. 24, 2022

(30) Foreign Application Priority Data
Oct. 18, 2019 (GB) ..................................... 1915109

(51) Int. Cl.
*H01P 3/12* (2006.01)
*H01P 5/107* (2006.01)

(52) U.S. Cl.
CPC ................ *H01P 3/12* (2013.01); *H01P 5/107* (2013.01)

(58) Field of Classification Search
CPC ........................................................ H01P 3/12
(Continued)

(56) References Cited

U.S. PATENT DOCUMENTS 9,583,811 B2 2/2017 Seler et al.
2004/0263280 A1 12/2004 Weinstein
(Continued)

FOREIGN PATENT DOCUMENTS

WO 2018028762 A1 2/2018

OTHER PUBLICATIONS

Notice of Transmittal (Form PCT/ISA/220), International Search Report (Form PCT/ISA/210), and Written Opinion (Form PCT/ISA/237) for International Application No. PCT/GB2020/052614 mailed Dec. 1, 2020, 16 pages.
(Continued)

*Primary Examiner* — Benny T Lee
(74) *Attorney, Agent, or Firm* — Withrow + Terranova, PLLC; Vincent K. Gustafson

(57) ABSTRACT

An electronic device comprises a waveguide block defining a cavity therein. The device has a monolithic microwave or millimetre-wave integrated circuit device positioned at least partially in the cavity. The integrated circuit device comprises a dielectric substrate and a metal foil layer that extends outwards from an external edge of the dielectric substrate. The metal foil layer and the dielectric substrate define a through hole, wherein a first edge of the through hole is an edge of the metal foil layer and defines an end of the elongate waveguide channel, and wherein the metal foil layer at least partly determines both a length and a width of an elongate waveguide channel within the cavity.

20 Claims, 10 Drawing Sheets

(58) Field of Classification Search
USPC .......................................................... 333/248
See application file for complete search history.

(56) References Cited

U.S. PATENT DOCUMENTS

| | | | | |
|---|---|---|---|---|
| 2013/0229210 | A1 | 9/2013 | Siles et al. | |
| 2015/0372368 | A1* | 12/2015 | Pinta et al. | H01P 11/002 174/250 |
| 2018/0254229 | A1 | 9/2018 | Kuwabara | |

OTHER PUBLICATIONS

Search Report under Section 17(5) for United Kingdom Patent Application No. GB1915109.1 mailed Apr. 7, 2020, 5 pages.
Hassona, A., et al., "A Low-loss D-band Chip-to-Waveguide Transition Using Unilateral Fin-line Structure", 2018 IEEE/MTT-S International Microwave Symposium, pp. 390-393, published Jun. 10, 2018, doi: 10.1 109/MWSYM.2018.8439643.
Hollung, S., et al., "A Distributed Heterostructure Barrier Varactor Frequency Tripler," IEEE Microwave and Guided Wave Letters, vol. 10, No. 1, Jan. 2000, pp. 24-26.
Maestrini, A., et al., "In-Phase Power Combining of Submillimeter-Wave Multipliers," Proceedings of the 33rd International Conference on Infrared and Millimeter Waves and 16th International Conference on Terahertz Electronics, IEEE 2008, pp. 1-2.
Siles, J.V., et al., "Capability of Broadband Solid-State Room Temperature Coherent Sources in the Terahertz Range," Proceedings of the 39th International Conference on Infrared, Millimeter, and Terahertz waves (IRMMW-THz), IEEE, Sep. 2014, pp. 1-3.
Truettel, J., et al., "A 520-620 GHz Schottky Receiver Front-End for Planetary Science and Remote Sensing With 1070K-1500K DSB Noise Temperature at Room Temperature," IEEE Transactions on Terahertz Science and Technology, vol. 6, No. 1, Jan. 2016, pp. 148-155.
Wang, H., et al., "Development of a Two-Pixel Integrated Heterodyne Schottky Diode Receiver at 183GHZ," 19th International Symposium on Space Terahertz Technology, Groningen, Apr. 28-30, 2008, pp. 490-493.
Xu, Z., et al., "E-plane probe microstrip to waveguide transition with fin-line back-short structure for millimetre wave application," Electronic Letters, published Nov. 9, 2017, vol. 53, No. 23, pp. 1532-1534, doi: 10.1049/el.2017.2048.
Ding, J., et al., "High Efficiency and Wideband 300 GHz Frequency Doubler Based on Six Schottky Diodes," Journal of Infrared, Millimeter and Terahertz Waves, Jul. 7, 2017, pp. 1-11 (reproduced in 16 pages).

* cited by examiner

MMIC DEVICE ON A SUBSTRATE AND MOUNTED WITHIN A WAVEGUIDE BLOCK, WHEREIN A METAL FOIL LAYER EXTENDS FROM THE SUBSTRATE TO FORM IN PART A THROUGH HOLE

This application is a 35 U.S.C. § 371 national phase filing of International Application No. PCT/GB2020/052614, filed on Oct. 16, 2020, and claims the benefit of United Kingdom Patent Application No. 1915109.1 filed on Oct. 18, 2019, wherein the entire contents of the foregoing applications are hereby incorporated by reference herein.

BACKGROUND OF THE INVENTION

The present invention relates to waveguide devices, in particular to waveguide devices for use in microwave and millimetre-wave (terahertz) systems.

A Monolithic Microwave Integrated Circuit, or MMIC (sometimes pronounced "mimic"), is a type of integrated circuit (IC) device that operates at microwave or terahertz frequencies (e.g., in frequency bands between approximately 300 MHz and 3 THz). MMIC devices may provide functions such as high-frequency mixing, frequency multiplication, direct detection, power amplification, low-noise amplification, and high-frequency switching and have applications in fields such as radar, telecommunications, and remote sensing (e.g. Earth and Space sensing).

Before MMICs were developed, only discrete-component devices were used in the art. Such discrete-component devices are typically semiconductor-based in which the active components, e.g. diodes, are soldered to a substrate, typically quartz or aluminium nitride. However, the assembly of these discrete-component devices is generally difficult and often results in alignment errors which generally leads to a relatively wide scatter in the output of such discrete-component devices. These discrete-component devices may also have poor thermal properties which may also contribute to poor performance.

In order to overcome these issues, integrated devices have been used in which the diode(s) are integrated on a substrate during fabrication. This can provide improvements in the alignment between the diode(s) and the microstrip matching networks typically employed by such devices. Integrated devices may also provide for easier assembly, an improved thermal layout, and an improved consistency of the output of such devices.

The substrate may be gallium arsenide or a substrate transfer to silicon, aluminium nitride, silicon dioxide, etc.

MMIC devices are typically placed in a cavity within a waveguide block—e.g. as a suspended microstrip. However, high precision machining of waveguide blocks is difficult and expensive. In particular, as the operating frequency increases from microwave to terahertz frequencies, the dimensions of the waveguide and cavity become smaller, thus requiring tighter tolerances in order to achieve a desired performance. For example, with an operating frequency of 300 GHz, a machining tolerance of as little as ±10 μm can result in significant performance variability, both in terms of the tuned frequency and the impedance of the cavity.

SUMMARY OF THE INVENTION

When viewed from a first aspect, the present invention provides an electronic device comprising:

- a waveguide block defining a cavity therein; and
- a monolithic microwave or millimetre-wave integrated circuit device positioned at least partially in the cavity, wherein:
- the integrated circuit device comprises a dielectric substrate and a metal foil layer that extends outwards from an external edge of the dielectric substrate;
- the metal foil layer and the dielectric substrate define a through hole, wherein a first edge of the through hole is an edge of the metal foil layer and defines an end of the elongate waveguide channel; and
- the metal foil layer at least partly determines both a length and a width of an elongate waveguide channel within the cavity.

When viewed from a second aspect, the present invention provides a monolithic microwave or millimetre-wave integrated circuit device for use in a waveguide block that defines a cavity, wherein:

- the integrated circuit device comprises a dielectric substrate and a metal foil layer that extends outwards from an external edge of the dielectric substrate;
- the metal foil layer is shaped to determine, at least partly, both a length and a width of an elongate waveguide channel within the cavity, when the monolithic microwave integrated circuit device is situated at least partially within the cavity of the waveguide block; and
- the metal foil layer and the dielectric substrate are shaped to define a through hole, wherein a first edge of the through hole is an edge of the metal foil layer for defining an end of the elongate waveguide channel.

More generally, when viewed from another aspect, the present invention provides an electronic device comprising:

- a waveguide block defining a cavity therein; and
- a monolithic microwave or millimetre-wave integrated circuit device positioned at least partially in the cavity, the integrated circuit device comprising a dielectric substrate and a metal foil layer that extends outwards from an external edge of the dielectric substrate, wherein the metal foil layer at least partly determines both a length and a width of an elongate waveguide channel within the cavity.

When viewed from a further aspect, the present invention provides a monolithic microwave or millimetre-wave integrated circuit device for use in a waveguide block that defines a cavity, wherein the integrated circuit device comprises a dielectric substrate and a metal foil layer that extends outwards from an external edge of the dielectric substrate; and wherein the metal foil layer is shaped to determine, at least partly, both a length and a width of an elongate waveguide channel within the cavity, when the monolithic microwave integrated circuit device is situated at least partially within the cavity of the waveguide block.

Thus it will be appreciated that the present invention provides an improved MMIC device that, once placed in the cavity, intrinsically defines a channel length and channel width of a waveguide channel within the cavity, thereby controlling the electromagnetic wave propagation characteristics of the cavity. The channel length and width are both determined, at least in part, by a metal foil layer, instead of depending on the cavity alone to determine the dimensions of a waveguide channel. This can make accurately controlling the waveguide parameters easier, reducing the design and fabrication burden associated with tight tolerance requirements, because it is generally easier to fabricate the metal foil layer to meet a desired tolerance than it is to fabricate a waveguide block to the same tolerance. In particular, it may allow both the frequency response and the impedance of the device to be controlled more easily and accurately than in known devices. It may therefore be possible, in some instances, to fabricate the waveguide block with a looser tolerance on the cavity dimensions than would otherwise be required, because the metal foil of the MMIC that sits within the cavity determines the effective channel length and the effective channel width of the electronic device.

The dielectric substrate and the metal foil layer may be fabricated in a common fabrication process. The alignment of the foil layer with other elements of the MMIC device can thus be determined by a semiconductor manufacturing process and so be highly accurate, thereby enabling a very accurate alignment between the MMIC device and the waveguide channel.

The metal foil layer may define the length of the waveguide channel by being configured (e.g. shaped) to define an end of the waveguide channel. The metal foil layer may define the width of the waveguide channel by being configured (e.g. shaped) to provide at least one edge of the waveguide channel. In some embodiments, the foil layer may provide two edges of the waveguide channel, which may be opposite edges.

The cavity in the waveguide block may comprise an elongate cavity (which may be only a portion of a larger cavity) having a first length and a first width. The cavity may be defined by one or more walls, which may be planar or curved. The elongate cavity may have a rectangular cross-section (which may be constant along the first length, although this is not essential). The elongate cavity may be closed at one end. The waveguide channel may be within the elongate cavity. The waveguide channel defined at least partly by the foil layer may have a second length and a second width. The second length may be less than the first length, and the second width may be less than the first width. The lengths may be determined relative to a point on the dielectric substrate, or any other convenient point. The lengths may be maximum or minimum or average (e.g., mean) lengths along an axis of the elongate channel. The widths may be maximum or minimum or average (e.g., mean) widths over the respective lengths. The widths may be determined perpendicular to an axis of the elongate channel—i.e. perpendicular to the lengths. The MMIC may be substantially planar, and the widths may be determined parallel with a plane of the MMIC device.

Moreover, since the metal foil layer extends from the dielectric substrate, and is preferably bonded to the dielectric substrate, the alignment of the elongate waveguide channel relative to the dielectric substrate can be accurately controlled and is less sensitive to the exact positioning of the MMIC within the waveguide block. The metal foil layer, when clamped between the two halves of the waveguide block, may hold the substrate in position.

Thus, some embodiments provide an electronic device comprising:

- a waveguide block comprising a first portion and a second portion defining a cavity therebetween; and
- a monolithic microwave or millimetre-wave integrated circuit device positioned at least partially in the cavity, the integrated circuit device comprising a dielectric substrate and a metal foil layer that extends outwards from an external edge of the dielectric substrate, wherein the metal foil layer is clamped between the first and second portions of the waveguide block so as to provide mechanical support to the dielectric substrate, and wherein the metal foil layer at least partly determines both a length and a width of an elongate waveguide channel within the cavity.

Typically, the channel length of a closed-ended waveguide cavity influences the 'tuned' frequency of the cavity. It is known for a waveguide block to provide a 'backshort' in order to set the channel length to a desired value. However, in accordance with certain embodiments of the present invention, the foil layer advantageously provides a backshort that is integrated as part of the MMIC device itself. The backshort may define the end of the elongate waveguide channel. The waveguide block itself need not then act as a backshort, as is typically the case with arrangements known in the art per se. The waveguide cross-section and termination distance (defined by the backshort) can be important for determining how the device behaves.

The impedance of a waveguide channel typically depends on the width of the channel. The metal foil may determine an effective width for the elongate waveguide channel within the waveguide cavity. Moreover, the metal foil may effectively confine the electromagnetic fields beyond the edges of the foil, i.e. away from the walls of the waveguide cavity. The impedance of the waveguide channel may thus be partly or wholly defined by the shape of the metal foil, rather than wholly by the dimensions of the waveguide cavity itself. This therefore allows the machining tolerance of the cavity width to be relaxed compared to that of conventional arrangements.

The waveguide block may be conductive (e.g. comprising metal), although in some embodiments the waveguide block could be dielectric. The waveguide block may comprise a first portion (or shell) and a second portion (or shell) which, when brought together, define the cavity. An electric field may be confined by a conductor short-circuiting the first and second portions of the waveguide block. The metal foil layer may terminate the elongate cavity at a point in space required so as to efficiently or optimally reflect electromagnetic (EM) energy back toward a probe for collecting the EM energy (e.g. a probe of the MMIC device). The reflected EM energy may superimpose (i.e. combine) in-phase with the incident wave, setting up a standing wave (i.e. spatially constant) which imposes a particular impedance at a given point in the circuit or transforms one impedance to another within the circuit.

The metal foil layer may comprise one or more distinct foil sections which may be physically separated from each other. Some or all of the foil layer (e.g. one or more foil section) may be electrically connected to the waveguide block, or otherwise grounded. The foil layer may be substantially planar, or planar over a majority of its surface by area, when assembled within the waveguide block. The metal foil layer may be planar away from the dielectric substrate, but may, in some embodiments, curve out of this plane adjacent or touching the dielectric substrate. Any suitable metal may be used for the foil, as the function is achieved due to the conductive properties of the metal foil. In some embodiments the metal foil layer comprises a gold foil layer. Gold may be preferred because of the relatively high conductivity and malleability thereof as compared to other metals and because gold is relatively inert under atmospheric conditions, making gold easier to handle during fabrication.

The metal foil layer may provide mechanical support to the dielectric substrate. The metal foil layer may be fastened or bonded to the dielectric substrate. The metal foil layer may also be fastened or bonded to the waveguide block (e.g. chemically, or by friction). The metal foil layer may extend from at least two edges of the dielectric substrate—e.g., with respective foil sections extending in opposite directions.

It is possible that, in some embodiments, a second edge of the elongate waveguide channel is defined by a face of the waveguide block. However, in other embodiments, the metal foil layer is further configured (e.g. shaped) to define a second edge of the elongate waveguide channel. The second edge may be parallel to the first edge. In this way, the effective width of the waveguide channel may advantageously be determined wholly by the shape of the metal foil layer, and need not depend on the precision of the cavity machining at all.

The metal foil layer and dielectric substrate may define a through hole. Such an arrangement conveniently enables the foil layer to provide one or more edges that may determine the width and length of the waveguide channel, while facilitating a precise fabrication alignment between the foil layer and the substrate from which the foil extends. The through hole may be framed by the metal foil layer around a majority of the circumference of the hole—e.g. around three sides of a rectangular hole. The hole may be framed by the dielectric substrate along a portion of its circumference—e.g., around a fourth side of a rectangular hole. While the through hole may be framed in part by the waveguide block, preferably the through hole is a closed hole, completely surrounded by the metal foil layer and the dielectric substrate. The through hole may be elongate. The through hole may be rectangular. A first edge of the through hole may define the end of the elongate waveguide channel. A second edge of the through hole may define the first side edge of the elongate waveguide channel. The first and second edges of the hole may be perpendicular. A third edge of the through hole may define the second side edge of the elongate waveguide channel. The second and third edges of the hole may be parallel. Any or all of the first, second and third edges may be edges of the foil layer. A fourth edge may be an edge of the dielectric substrate. Any of the edges may be straight edges.

More generally, the metal foil may comprise an edge which determines the length of the elongate waveguide channel. The edge may be suspended within the cavity. The edge may span the cavity. The edge may be a straight edge. The ability to determine the shape of this edge—e.g. to provide a straight edge—can be advantageous over conventional designs in which the shape of the end of a waveguide channel may be constrained by the machining used to create the cavity—e.g. constrained to be semi-circular with a fixed or minimum radius. This may allow better control over the electromagnetic field within the waveguide channel.

The metal foil layer may act as a finline waveguide within the cavity. The foil layer may cause a perturbation of electromagnetic fields which may define the effective width, and hence impedance, of the waveguide channel.

The cavity may comprise a plurality of elongate cavities. The waveguide block may define one or more waveguide channels along one or more elongate cavities. The waveguide channel with a length and width which is determined by the metal foil layer may adjoin or be a continuation of a waveguide channel with a width which is defined by faces of the waveguide block and which may be wider than the first width defined by the metal foil layer.

The dielectric substrate may be shaped in order to fit partly or wholly within the waveguide cavity. In at least some embodiments, the substrate is planar or substantially planar. In a set of such embodiments, the substrate is elongate, having a substrate length along a device direction and a substrate width substantially perpendicular to the device direction. The metal foil may be shaped such that the elongate waveguide channel has an axis substantially perpendicular to an axis of the dielectric substrate.

In preferred embodiments, the substrate comprises a gallium arsenide substrate. Gallium arsenide (GaAs) may be preferred over silicon (Si) due to its higher device (transistor) speed which is beneficial for high-frequency applications.

In some embodiments, the substrate carries an integrated circuit. The integrated circuit may form only a portion of larger electrical circuit. In a preferred set of such embodiments, the integrated circuit comprises at least one active component. These one or more active components may comprise one or more diodes and/or transistors. The active component may be arranged to receive a signal from along the waveguide channel, or to output a signal along the waveguide channel. The integrated circuit may comprise a mixer, a filter, an amplifier, a multiplier, a frequency divider, a detector, a duplexer, a diplexer, an oscillator, etc.

BRIEF DESCRIPTION OF THE DRAWINGS

Certain embodiments of the present invention will now be described with reference to the accompanying drawings, in which.

DETAILED DESCRIPTION OF THE INVENTION

Figure 1:
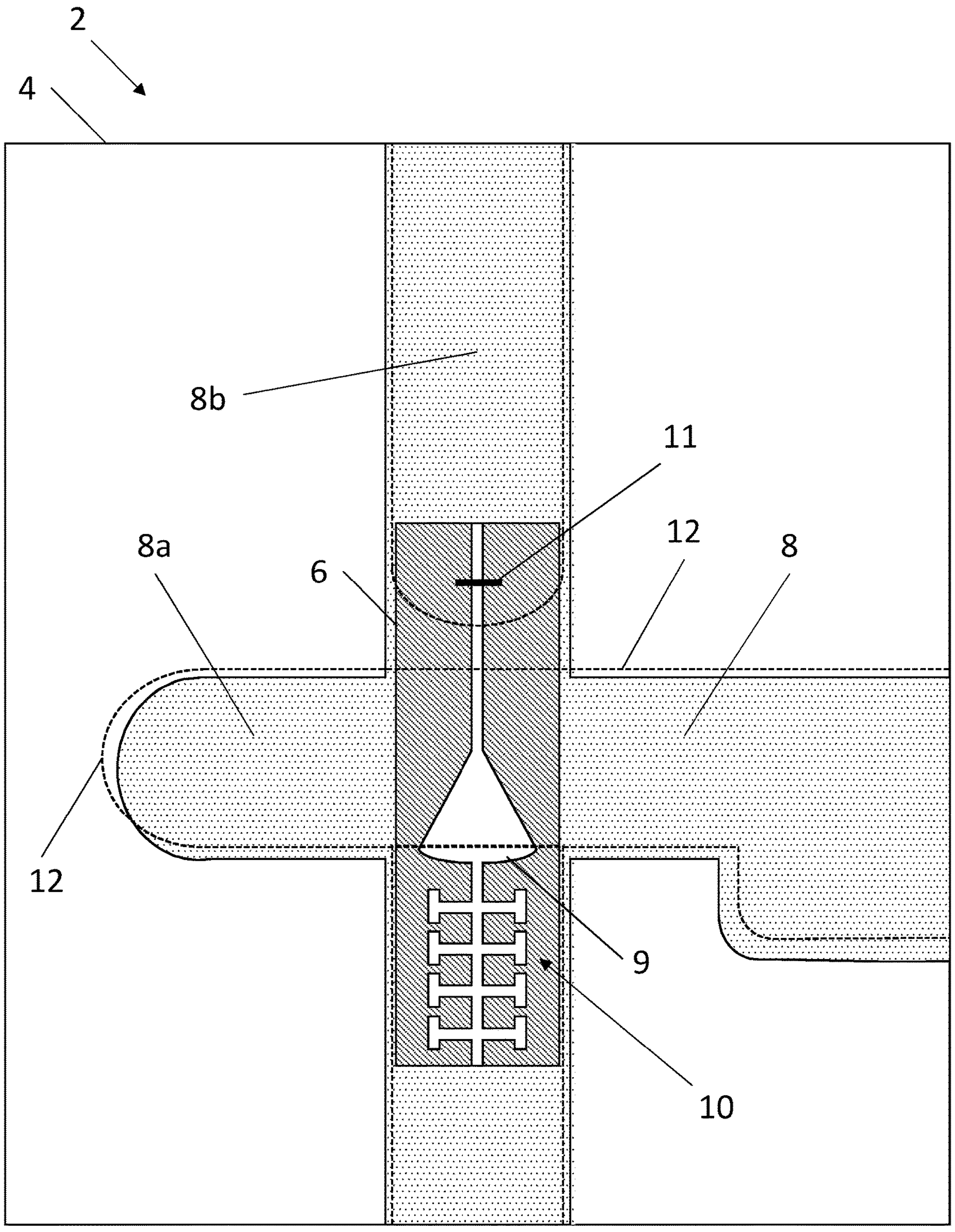
FIG. 1 is a schematic drawing of an exemplary MMIC device in a waveguide cavity.

FIG. 1 is a schematic drawing of an electronic device 2 of an exemplary design comprising a waveguide block 4, in which a MMIC device 6 is positioned within a waveguide cavity 8. This particular device 2 is a frequency doubler circuit. The substrate of the MMIC device 6 provides a probe 9, a set of bias filters 10, and a diode 11, located within the waveguide cavity 8. The diode 11 could be discrete or monolithically integrated with the MMIC device 6. Those skilled in the art will appreciate that frequency doubler 2 generates an output signal at twice the frequency of the input signal due to the non-linear properties of the diode 11, where the output power is the product of the input power applied and the circuit conversion efficiency.

The waveguide block 4 is formed from upper and lower portions, split in the E-plane (the plane containing the electric field vector), which have been brought together to define the cavity 8.

The waveguide cavity 8, defined by surfaces of the waveguide block 4, acts as a waveguide channel for guiding microwave or millimetre-wave signals through the device 2. In this example, the cavity 8 includes an output waveguide channel 8*a* and an input waveguide channel 8*b*, at right angles to each other. As can be seen in FIG. 1, there is a discrepancy between the dimensions and location of the waveguide cavity 8, denoted by solid lines filled with dotted shading, and the ideal cavity 12 denoted by the dashed lines, i.e. the intended cavity according to a modelled waveguide design. This discrepancy arises due to machining errors. Machining the cavity 8 is relatively difficult, and higher operating frequencies require tighter machining tolerances.

Due to this discrepancy between the actual cavity 8 and the ideal cavity 12, the waveguide termination does not have the intended dimension, relative to the position of the MMIC device 6, resulting in improper tuned frequency for the device 2. Similarly, the impedance of the waveguide depends on the width of the cavity, which also does not have the intended value.

By contrast, the metal foil provided in accordance with embodiments of the present invention sets an effective channel width and backshort position within the waveguide cavity, such that the impedance and tuned frequency are defined by the metal foil, rather than by the dimensions of the waveguide cavity itself. This therefore allows the machining tolerance of the cavity width to be relaxed compared to that of conventional arrangements.

Figure 2:
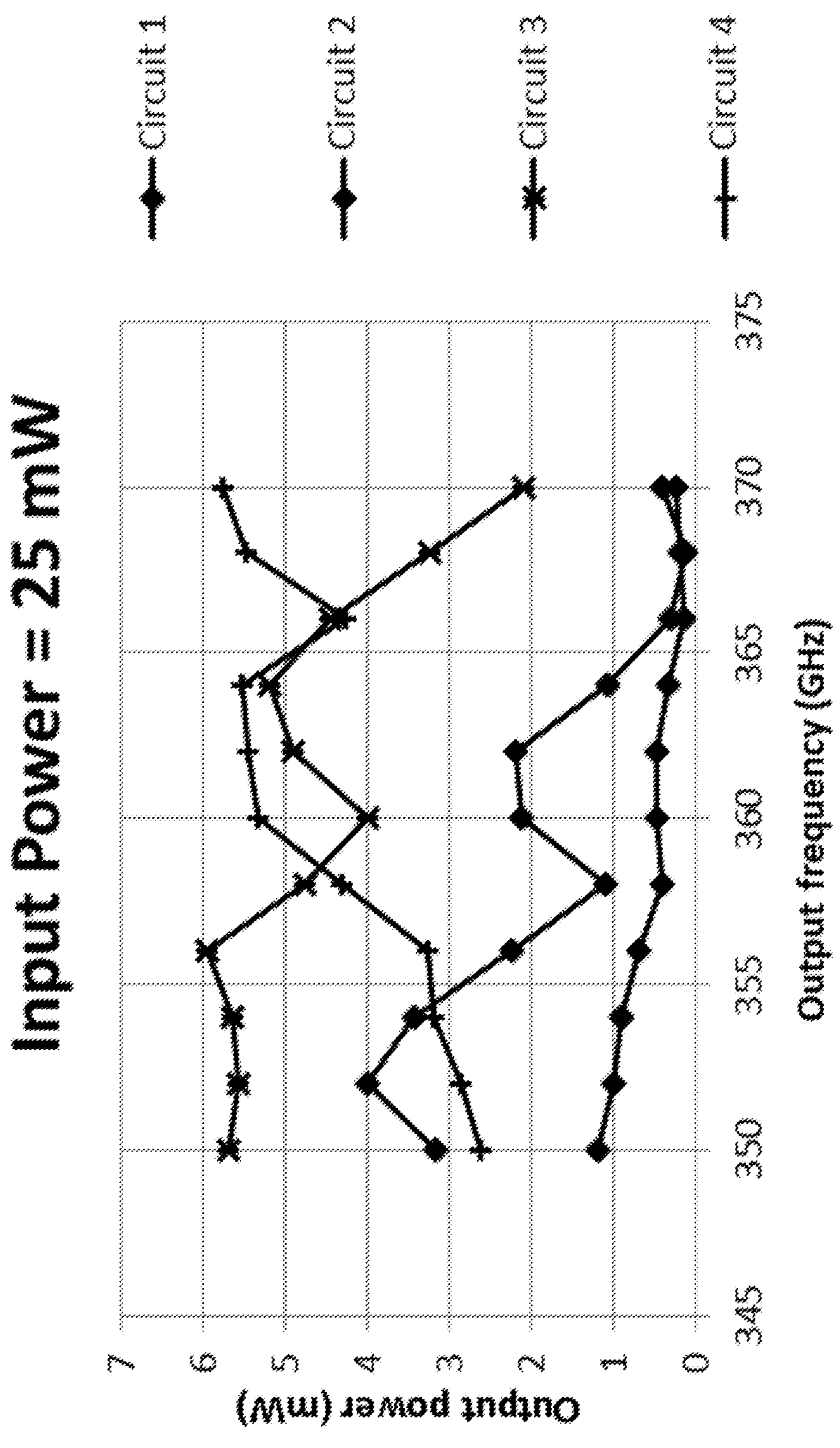
FIG. 2 is a graph illustrating a consistency issue associated with the device of FIG. 1.

FIG. 2 is a graph illustrating a consistency issue associated with the frequency doubler device of FIG. 1. Shown on the graph are plots of the output power (in mW) vs output frequency (in GHz), at a constant 25 mW input power, of four different conventional devices—labelled circuits 1-4—similar to the device 2 shown in FIG. 1. As can be seen from these plots, the performance of the four different devices is inconsistent across the devices. This inconsistency can, at least in part, be attributed to machining errors as described above.

Figure 3:
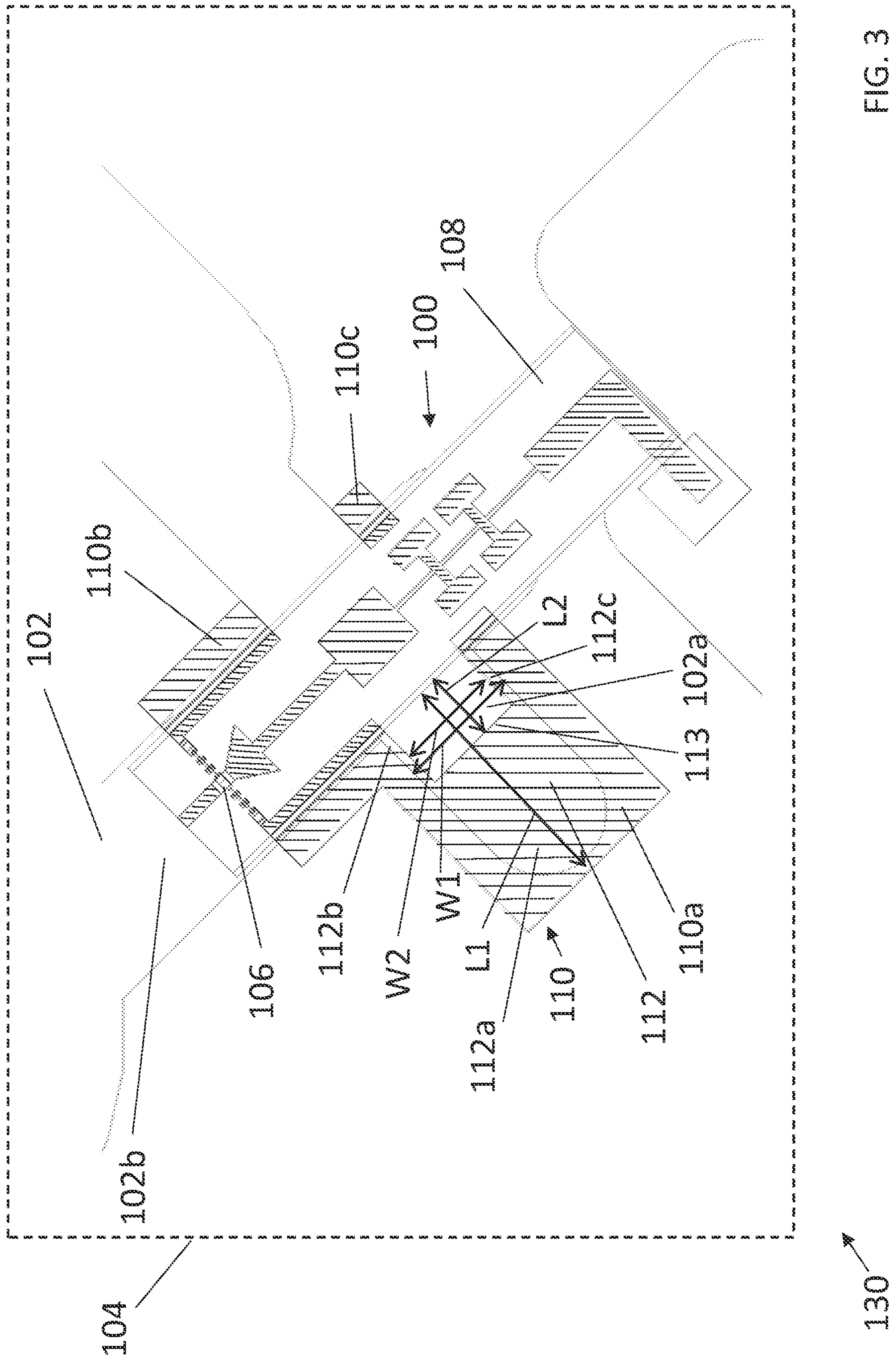
FIG. 3 is a schematic drawing of a MMIC device in a waveguide cavity in accordance with an embodiment of the present invention.
Figure 4:
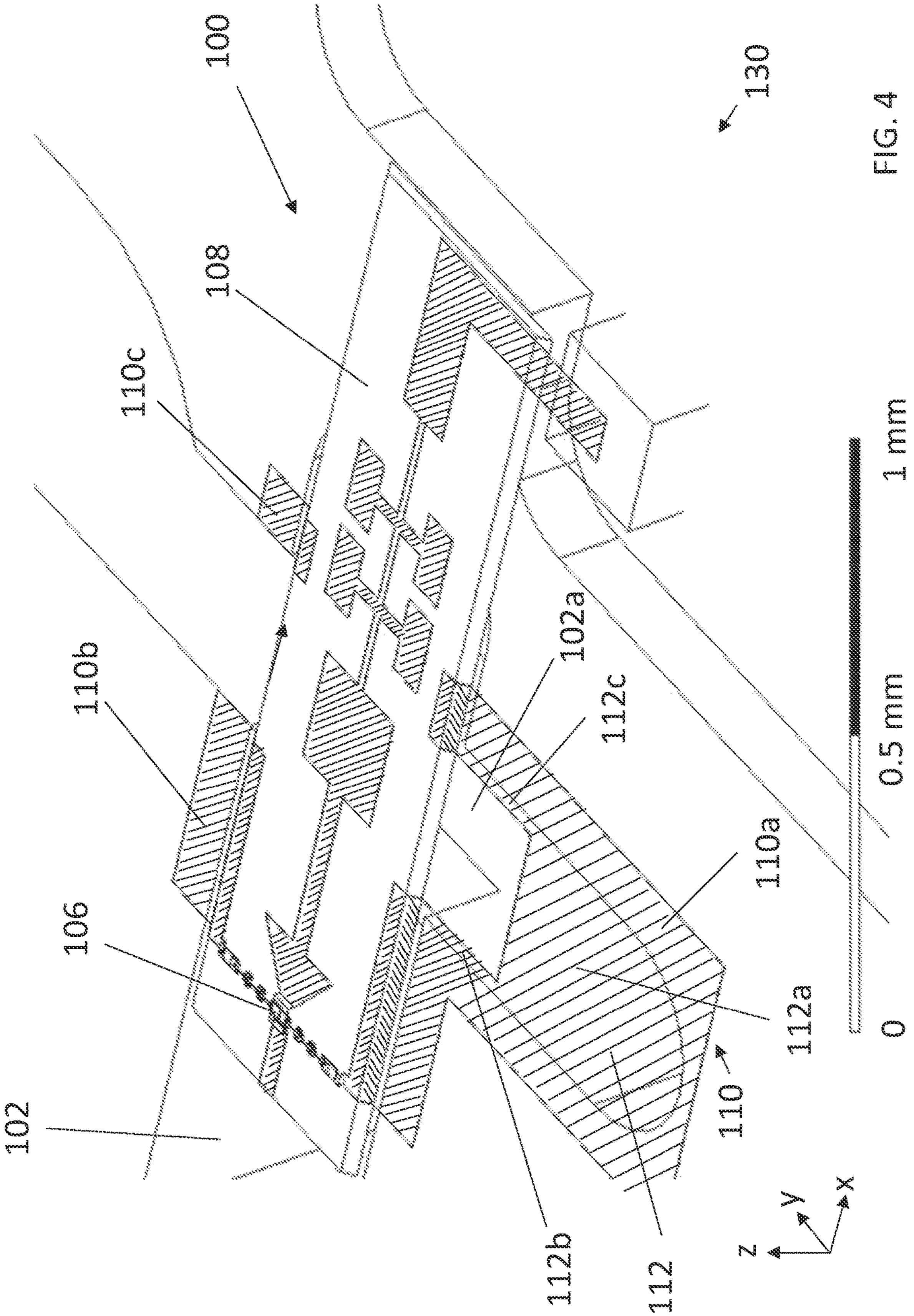
FIG. 4 is a further schematic drawing of the MMIC device of FIG. 3 from a further viewing angle.

FIG. 3 is a schematic drawing of an electronic device 130 comprising a MMIC device 100 in a waveguide cavity 102 in accordance with an embodiment of the present invention. FIG. 4 is a further schematic drawing of the electronic device 130 of FIG. 3 from a further viewing angle. FIG. 4 has like references for like parts to that of FIG. 3.

As with the device 2 of FIG. 1, in the device 130 of FIG. 3 the waveguide block 104 is formed from upper and lower portions, split in the E-plane, that, when assembled, have opposing complementary faces which come into contact with one another to form a single block 104.

The upper and lower portions define the cavity 102 there between and are otherwise in physical and electrical contact with one another across the opposing faces of the upper and lower portions. The cavity 102 includes an output cavity portion 102*a* and an input cavity portion 102*b*, at right angles to each other. The cavities 102*a*, 102*b* generally have rectangular cross-sections, which are of constant width in the vicinity of the MMIC device 100, apart from a circularly tapering end portion of the input cavity 102*a*. This circular taper is caused by the cylindrical machine tool used to form the cavity 102; its shape may be determined by a minimum radius of the cutter of the machine tool. The waveguide block 104 is, at least in this example, machined from an aluminium alloy, however it will be appreciated that other materials such as copper, brass, etc. may be used instead.

Rectangular waveguides support propagating modes in frequency bands determined from their physical dimensions. The dimensions of the waveguide determine the propagation characteristics and electrical properties, notably the impedance, of the waves supported in the waveguide.

The output cavity 102*a* has a constant width of W1 along most of a length L1, adjacent the MMIC device 100, and a width of less than W1 within the tapered end portion. The length L1 is measured from an edge of the dielectric substrate 108 to the end of the tapered end portion of the cavity 102*a*. In some embodiments, while L1 may be approximately 1 mm, and while W1 may be approximately 0.3 mm, the dimensions may vary according to desired design parameters. As will be explained in further detail below, the MMIC device 100 allows for these parameters to be greater than they should be for the desired waveguide tuned frequency and impedance. This lessens the need for such tight tolerances in the process used to machine the cavity 102 in the waveguide block 104. Thus this length L1 and width W1 are both greater than an intended length and width for which the total waveguide assembly is designed.

Similarly to the MMIC microstrip device 6 of FIG. 1, the MMIC microstrip device 100 of FIG. 3 provides a diode 106 integrated within the waveguide cavity 102, where the diode 106 is carried by the MMIC device 100. The microstrip device 100 comprises a dielectric substrate 108 which, in this particular example, is a gallium arsenide (GaAs) substrate. The GaAs substrate 108 carries the diode 106, which may be formed on the substrate 108 using known deposition techniques.

However, unlike the MMIC device 6 of FIG. 1, the MMIC device 100 of FIG. 3 is provided with a metal foil layer 110 that extends from the substrate 108. The foil layer in this example comprises three distinct portions 110*a*, 110*b*, 110*c*. The metal foil layer 110 may provide mechanical support to the dielectric substrate 108. The metal foil layer 110 may be fastened or bonded to the dielectric substrate 108. The metal foil layer 110 may also be fastened or bonded to the waveguide block 104 (e.g. chemically, or by friction). This metal foil layer 110 is, in this embodiment, gold. Gold is preferred due to its high conductivity and because gold is relatively inert under atmospheric conditions. This gold foil layer 110 extends laterally from the substrate 108 of the MMIC device 100 in various directions and is 'sandwiched' (i.e. clamped) between the upper and lower waveguide blocks when assembled. The foil is approximately 1 to 3 microns thick. The three distinct portions 110*a*, 110*b*, 110*c* of the metal foil layer 110 act as mechanical supports that hold the substrate 108 in a fixed position within the waveguide cavity 102. The foil layer 110 is grounded electrically to the waveguide block 104.

A region 112 of the gold foil portion 110*a* extends into the cavity 102*a*, parallel to the E-plane. This region 112 of the gold foil 110 causes a perturbation of the electromagnetic field which determines the effective length and impedance of an elongate waveguide channel within the cavity 102*a*. In particular, a region 112*a* shaped like a rectangle joined to a semicircle (the shape of which is partly defined by the straight walls and the curved tapering end wall of the cavity 102*a*) is suspended within the cavity 102*a* and spans the width of the cavity 102*a*. The region 112*a* has a free edge 113 which spans a width W2 of the cavity 102*a*. The region 112*a* acts as a backshort for a longer channel within the cavity 102, which reduces the effective maximum length of the channel by L1 minus L2, i.e. the electromagnetic wave is prevented from propagating in the semi-circular region 112*a* and the backshort in the cavity 102*a* is formed with length L2. Additionally, a first rectangular region 112*b*, of length L2 by width (W1−W2)/2, protrudes from, and runs parallel to, a first side wall of the cavity 102*a*, while a second rectangular region 112*c*, also of length L2 by width (W1−W2)/2, protrudes from, and runs parallel to, an opposite side wall of the cavity 102*a*. The rectangular regions 112*b*, 112*c* set the effective width of the waveguide channel, where the foil 112*b*, 112*c* is present, at a width W2, which is less than the width W1 of the machined cavity 102*a*. Thus the foil layer 110 both shortens and narrows the effective length and width of the cavity 102*a* to desired values.

In this way, the portion 112 of the gold foil layer 110 is what sets the effective length L2 and width W2 of the cavity with regard to electromagnetic waves propagating through the waveguide. As the gold foil 110 may be defined lithographically, this length L2 and width W2 are easier to control than the length L1 and the width W1 of the machined cavity, thus allowing a more precise resultant waveguide channel without the stringent machining tolerance requirements that would be imposed when attempting to use conventional techniques.

Figure 5:
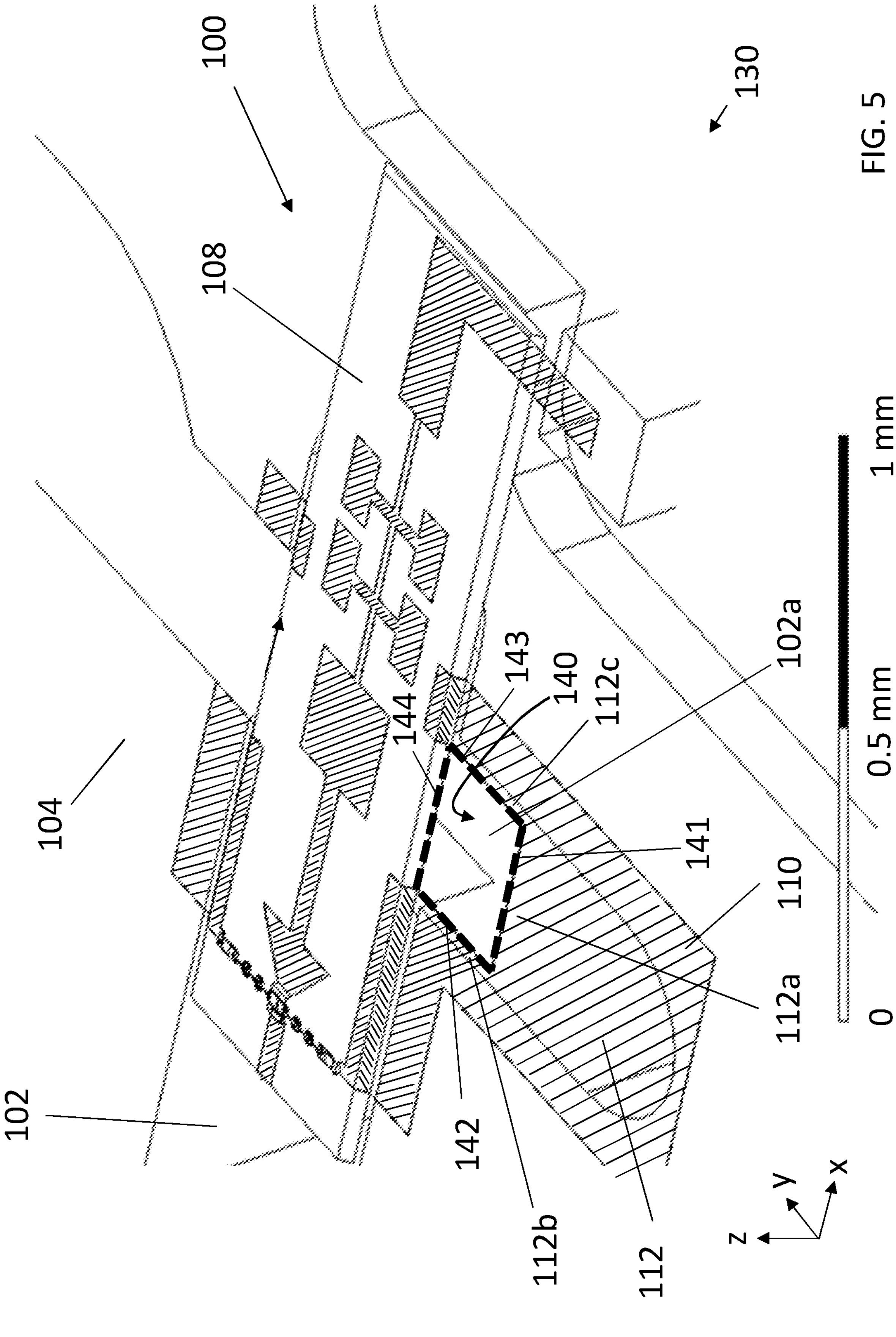
FIG. 5 is the same view as FIG. 4 but with a through hole highlighted.

FIG. 5 highlights the rectangular through hole 140 within the cavity 102 that is defined by the dielectric substrate 108 and the portions 112*a*, 112*b*, 112*c* of the gold foil layer 110. FIG. 5 has like references for like parts as shown in FIGS. 3 and 4. FIG. 5 also shows orthogonal axes (depicted as x, y, and z), and a scale running from 0 millimeters to 1 millimeter. A straight edge of the semi-circular region 112*a* defines a first edge 141 of the through hole 140. A straight edge of the first rectangular region 112*b* defines a second edge 142 of the through hole 140. A straight edge of the second rectangular region 112*c* defines a third edge 143 of the through hole 140, opposite the second edge 142. A straight edge of the dielectric substrate 108 defines a fourth edge 144 of the through hole 140, opposite the first edge 141. The first edge 141 defines an end of the elongate waveguide channel within the cavity 102*a*, while the second edge 142 and third edge 143 define respective side edges for the waveguide channel.

Figure 6B:
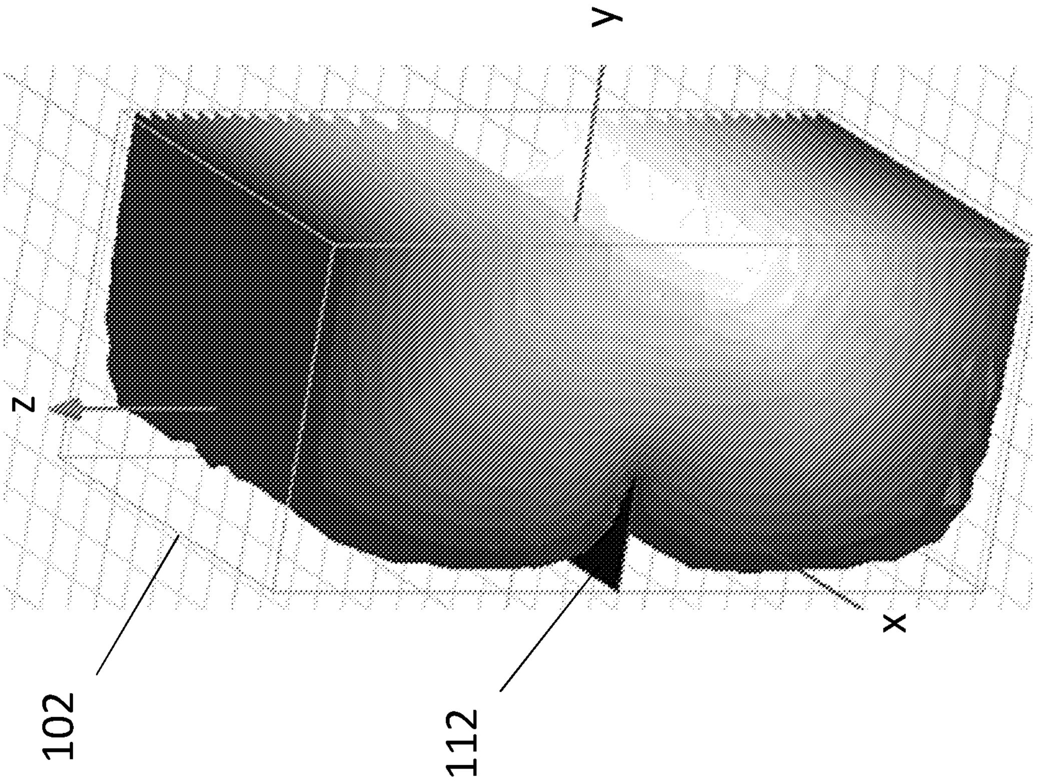
FIG. 6*b* is a simulated electromagnetic-field plot for the MMIC device of FIG. 3.
Figure 6A:
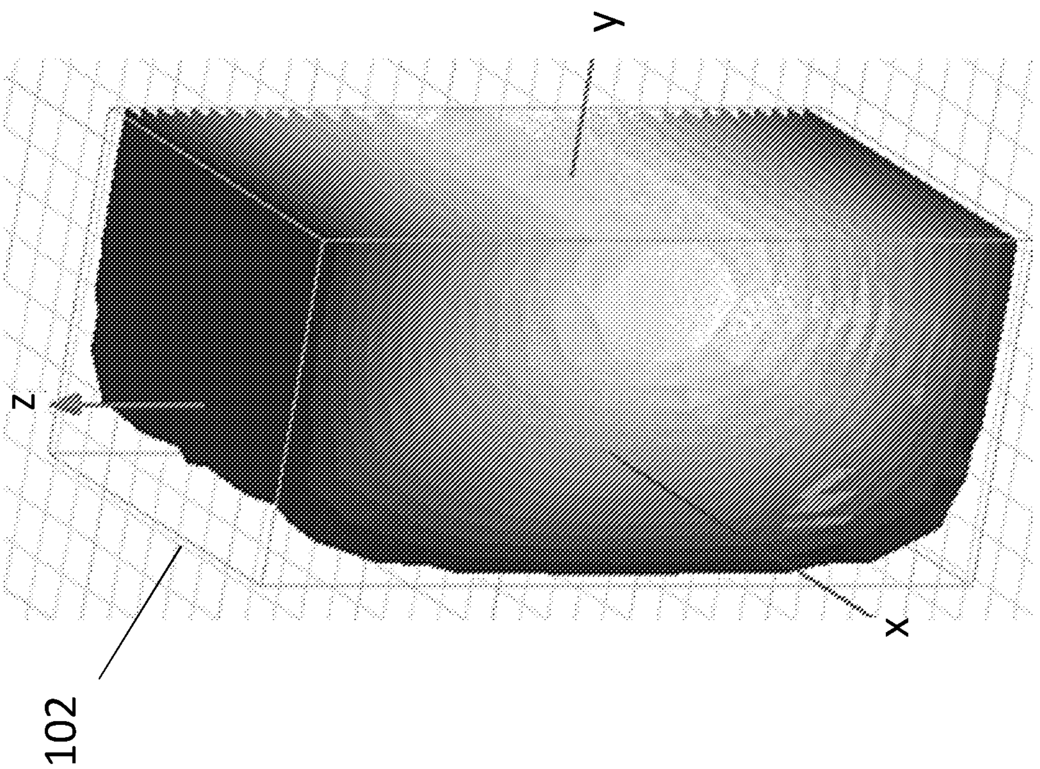
FIG. 6*a* is a simulated electromagnetic-field plot for a conventional MMIC design.

FIGS. 6*a* & 6*b* illustrate how the inclusion of the foil 110 (FIGS. 3, 4 & 5) perturbs the electromagnetic fields. FIGS. 6*a* & 6*b* show orthogonal axes (depicted as x, y, and z), and also show like references for like parts of FIGS. 3, 4 & 5. The contours in FIG. 6*a* show simulated electric field strengths for a shorted waveguide section at an end of a waveguide channel that does not have any foil protruding from the waveguide backshort—e.g., similar to the output waveguide channel 8*a* in the conventional device 2 of FIG. 1. The contours in FIG. 6*b* show simulated electric field strengths for a shorted waveguide section of the device 130 of FIG. 3, which has a region 112 of the gold foil 110 protruding into the waveguide cavity 102 from the waveguide backshort. It can be seen that the inclusion of the foil 110 causes the electric field to be compressed, compared with the foil-less conventional design. This demonstrates how the presence of the foil 110, and its dimensions, can strongly affect the electrical properties of the waveguide structure 104 as depicted in FIGS. 3 & 5.

Figure 7:
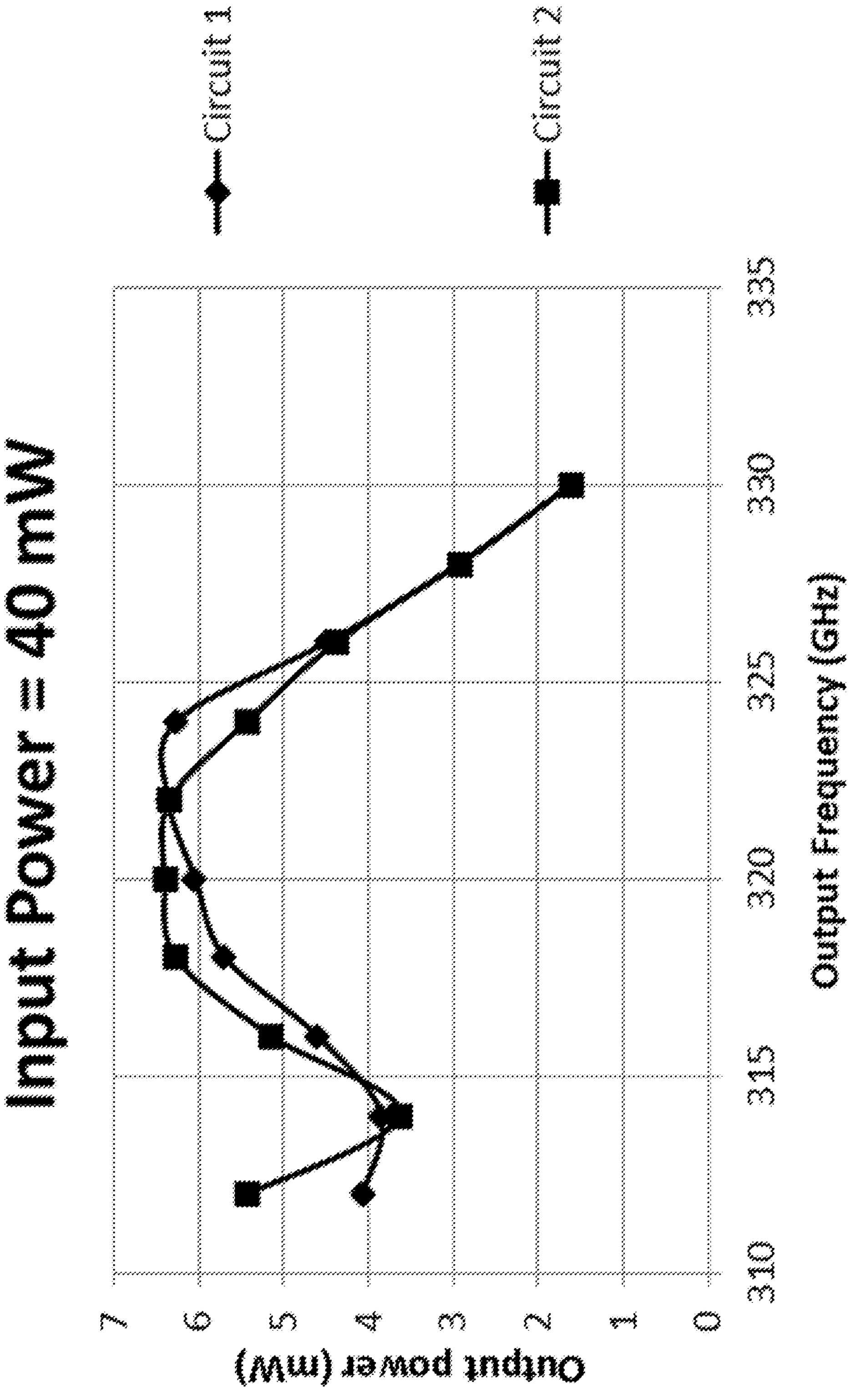
FIG. 7 is a graph illustrating an improvement in the consistency associated with the device of FIG. 3.

FIG. 7 is a graph illustrating an improvement in the consistency associated with devices 130 manufactured to the design of FIG. 3. Shown on the graph are plots of the measured output power vs output frequency (in GHz), at a constant 40 mW input power (in mW), of two devices—labeled Circuit 1 and Circuit 2—both constructed as per the design of FIG. 3.

As can be seen from these plots, the two different devices are relatively consistent, as the plots are far closer in values than those shown in FIG. 2, corresponding to the conventional device 2 of FIG. 1.

Figure 8:
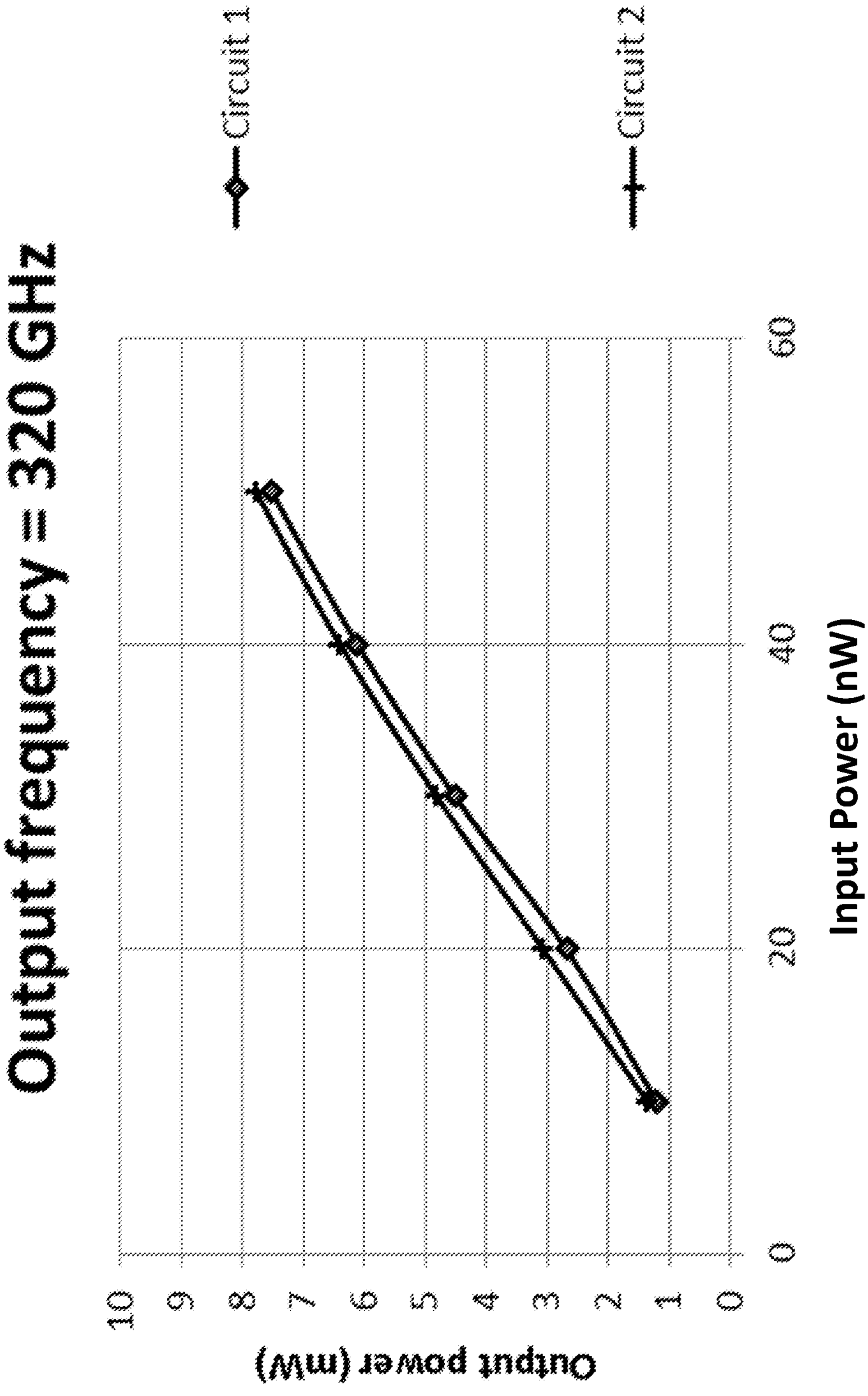
FIG. 8 is a further graph illustrating an improvement in the consistency associated with the device of FIG. 3.

FIG. 8 is a further graph illustrating an improvement in the consistency associated with the device 130 of FIG. 3. Shown on the graph are plots of the output power (in mW) vs input power (in nW) performance of the two devices (labeled Circuit 1 and Circuit 2) of FIG. 7, for an operating output frequency of 320 GHz. As can be seen from this graph, the two devices are consistent in terms of the relationship between their output power to input power transfer functions.

Figure 9:
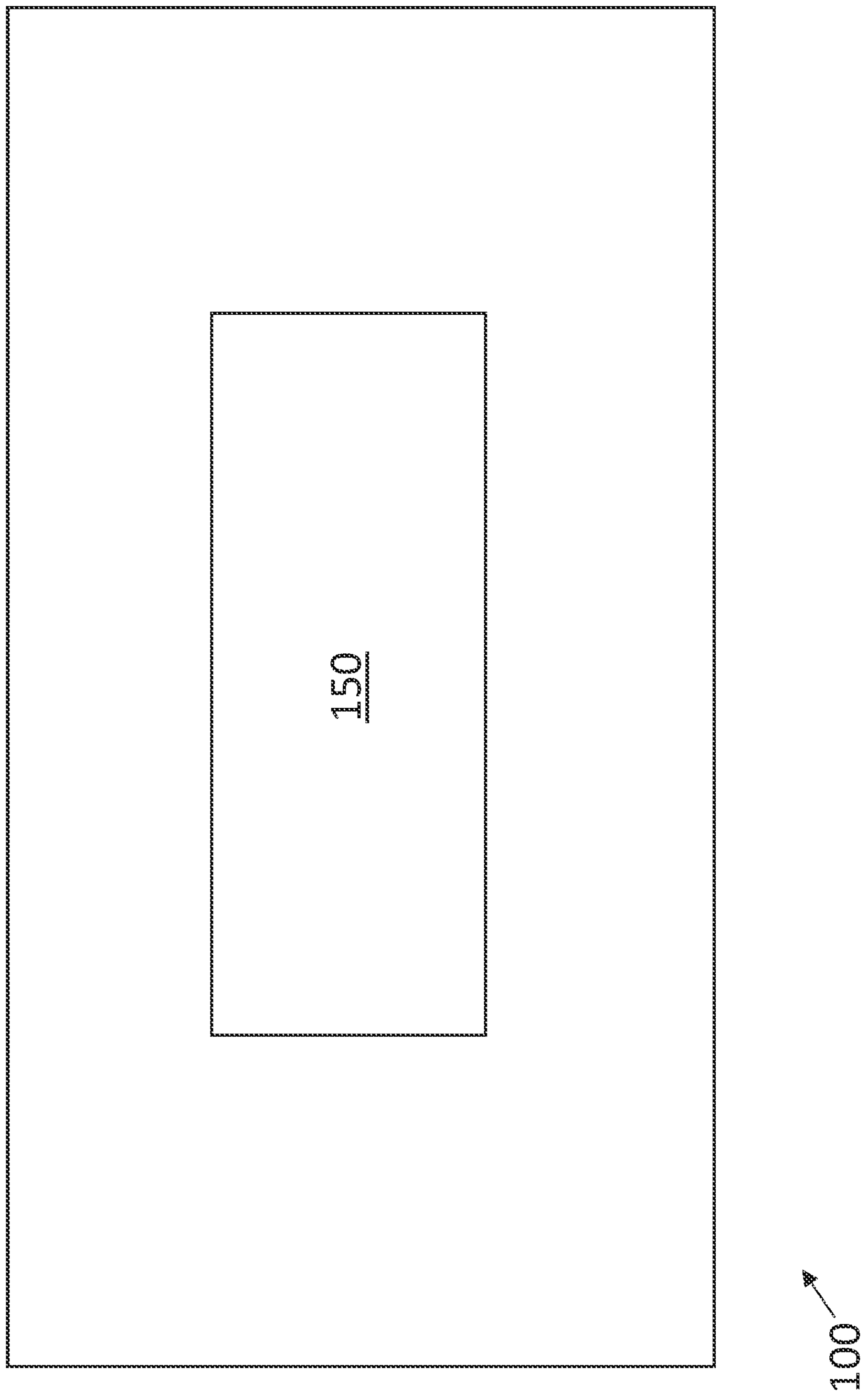
FIG. 9 is a schematic drawing of a dielectric substrate of a MMIC device in accordance with embodiments of the invention.

FIG. 9 is a schematic diagram (not to proportion or scale) of a MMIC device 100, as disclosed herein, that comprises a feature 150 that is a mixer, or a filter, or an amplifier, or a multiplier, or a frequency divider.

Figure 10:
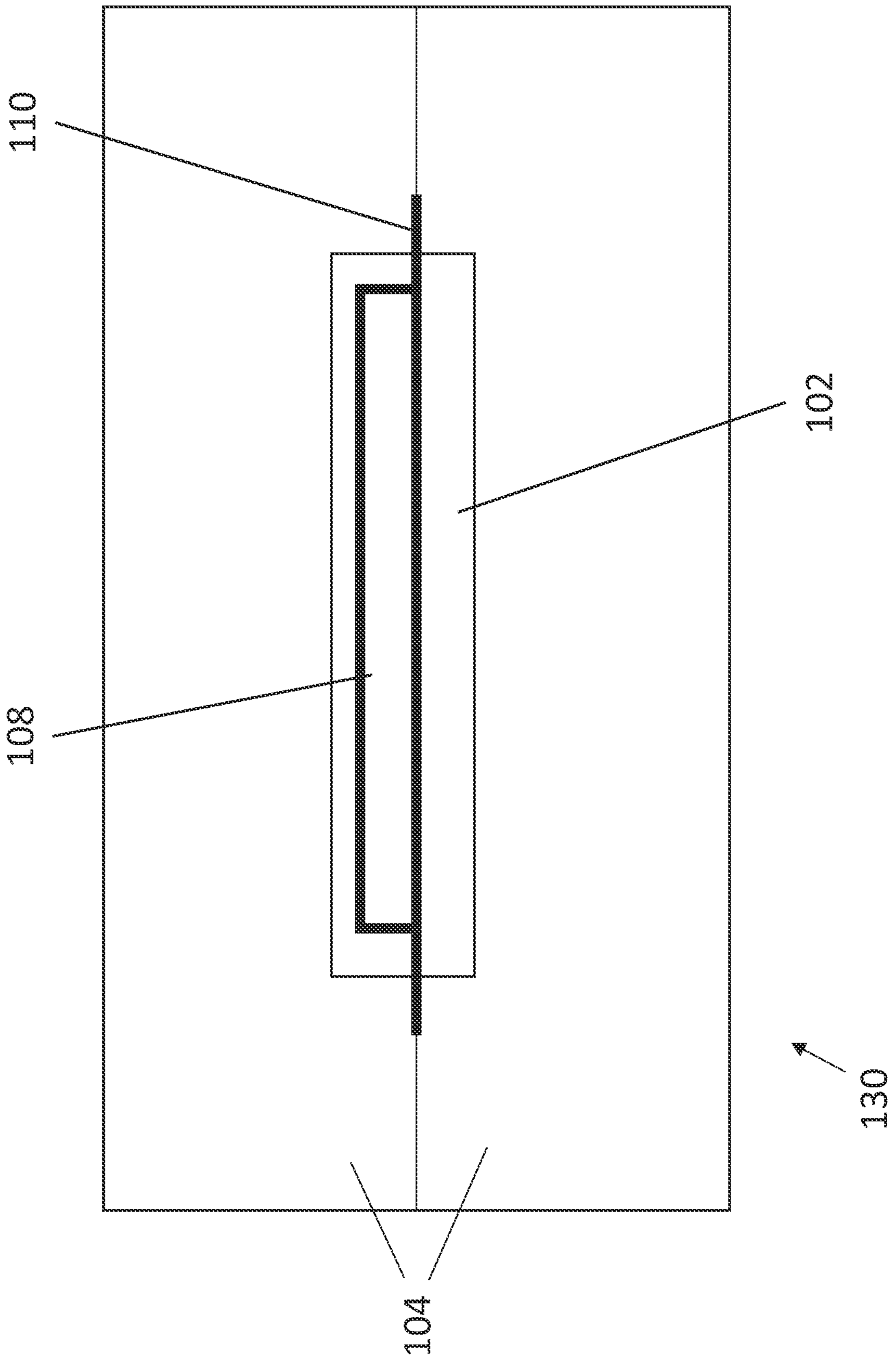
FIG. 10 is a schematic cross-section of a MMIC device clamped within a waveguide block in accordance with embodiments of the invention.

FIG. 10 is a schematic cross-section (not to proportion or scale) of an electronic device 130 comprising a MMIC device 100 (FIG. 9), as disclosed herein. The electronic device 130 comprises a waveguide block 104 with a cavity 102 between a first portion and a second portion of the waveguide block 104. A metal foil layer 110 of the MMIC device 100 is clamped between the first and second portions of the waveguide block 104 so as to provide mechanical support to a dielectric substrate 108 of the MMIC device 100.

Thus it will be appreciated by those skilled in the art that embodiments of the present invention provide an improved MMIC device that allows for simpler and more accurate control of the tuned frequency and impedance characteristics of a waveguide channel, rather than relying on precise machining of the waveguide cavity itself. As the channel length and width are both controlled by the metal foil layer, the design and fabrication burden associated with tight tolerance requirements are reduced.

While specific embodiments of the invention have been described in detail, it will be appreciated by those skilled in the art that the embodiments described in detail are not limiting on the scope of the claimed invention, which is defined by the appended claims.

The invention claimed is:

1. An electronic device comprising:

a waveguide block defining a cavity therein; and a monolithic microwave or millimetre-wave integrated circuit device positioned at least partially in the cavity, wherein:

the monolithic microwave or millimetre-wave integrated circuit device comprises a dielectric substrate and a metal foil layer that extends outwards from an external edge of the dielectric substrate;

the metal foil layer and the dielectric substrate define a through hole, wherein a first edge of the through hole is an edge of the metal foil layer, and wherein the first edge of the through hole forms an end of an elongate waveguide channel within the cavity; and the metal foil layer at least partly determines both a length and a width of the elongate waveguide channel.

2. The electronic device of claim 1, wherein the metal foil layer additionally forms at least one edge of the waveguide channel.

3. The electronic device of claim 1, wherein the cavity comprises an elongate cavity portion having a first length and a first width, the elongate waveguide channel being located within the elongate cavity portion, and the elongate waveguide channel having a second length and a second width, wherein the second length is less than the first length and wherein the second width is less than the first width.

4. The electronic device of claim 1, wherein the metal foil layer is fastened or bonded to the dielectric substrate and to the waveguide block.

5. The electronic device of claim 1, wherein the waveguide block comprises a first portion and a second portion defining the cavity therein therebetween, and wherein the metal foil layer is clamped between the first and second portions of the waveguide block so as to provide mechanical support to the dielectric substrate.

6. The electronic device of claim 1, wherein the dielectric substrate is substantially planar.

7. The electronic device of claim 1, wherein the dielectric substrate comprises a gallium arsenide substrate.

8. The electronic device of claim 1, wherein the through hole is a closed hole completely surrounded by the metal foil layer and by the dielectric substrate.

9. A monolithic microwave or millimetre-wave integrated circuit device for use in a waveguide block that defines a cavity, wherein:

the monolithic microwave or millimetre-wave integrated circuit device comprises a dielectric substrate and a metal foil layer that extends outwards from an external edge of the dielectric substrate;

the metal foil layer is shaped to determine, at least partly, both a length and a width of an elongate waveguide channel within the cavity, when the monolithic microwave or millimetre-wave integrated circuit device is situated at least partially within the cavity of the waveguide block; and the metal foil layer and the dielectric substrate are shaped to define a through hole, wherein a first edge of the through hole is an edge of the metal foil layer and wherein the first edge of the through hole forms an end of the elongate waveguide channel.

10. The integrated circuit device of claim 9, wherein the metal foil layer is additionally shaped to form at least one edge of the waveguide channel.

11. The integrated circuit device of claim 9, wherein a majority of a circumference of the through hole is framed by the metal foil layer, and wherein a further portion of the circumference of the through hole is framed by the dielectric substrate.

12. The integrated circuit device of claim 9, wherein the through hole has a second edge for defining a first side edge of the elongate waveguide channel, and a third edge for defining a second side edge of the elongate waveguide channel, wherein the second and third edges are edges of the metal foil layer.

13. The integrated circuit device of claim 12, wherein the through hole is a rectangular hole and has a fourth edge that is an edge of the dielectric substrate.

14. The integrated circuit device of claim 9, wherein the dielectric substrate is part of a microstrip.

15. The integrated circuit device of claim 9, wherein the substrate carries an integrated circuit comprising at least one active component.

16. The integrated circuit device of claim 15, wherein the monolithic microwave or millimetre-wave integrated circuit device comprises at least one of a mixer, a filter, an amplifier, a multiplier or a frequency divider.

17. The integrated circuit device of claim 9, wherein the metal foil layer comprises a gold foil layer.

18. The integrated circuit device of claim 9, wherein the dielectric substrate is elongate along a first axis, and wherein the metal foil is shaped such that the waveguide channel is elongate along a second axis substantially perpendicular to the first axis of the dielectric substrate.

19. The integrated circuit device of claim 9, wherein the metal foil layer and the dielectric substrate are shaped so that the through hole is framed in part by the metal foil layer, in part by the dielectric substrate, and in part by the waveguide block.

20. The integrated circuit device of claim 9, wherein the through hole is a closed hole completely surrounded by the metal foil layer and by the dielectric substrate.

* * * * *